United States Patent [19]

McDonald et al.

[11] 3,786,439

[45] Jan. 15, 1974

[54] ERROR DETECTION SYSTEMS

[75] Inventors: Earl G. McDonald, Boulder, Colo.; Arvind M. Patel, Wappingers Falls, N.Y.

[73] Assignee: International Business Machines Corporation, Armonk, N.Y.

[22] Filed: Dec. 26, 1972

[21] Appl. No.: 317,984

[52] U.S. Cl. .......... 340/146.1 AL, 340/146.1 F, 340/174.1 B

[51] Int. Cl. .... H03k 13/34, H041 1/10, G11b 27/36

[58] Field of Search .......... 340/146.1 AL, 146.1 F, 340/174.1 B

[56] References Cited

UNITED STATES PATENTS 3,703,705 11/1972 Patel .......... 340/146.1 AL

*Primary Examiner*—Eugene G. Botz
*Assistant Examiner*—R. Stephen Dildine, Jr.
*Attorney*—Herbert F. Somermeyer

[57] ABSTRACT

Error detection is enhanced by using multiple independent error codes combined with nonlinear changes in the data field as applied to different error codes. Such nonlinear permutations increase the probability of detecting errors thereby maximizing the utilization of check bit redundancies. In a magnetic tape subsystem, error detection and correction can be enhanced by scrambling track-to-error code relationships between a plurality of independent codes. Tracks with the highest probability of errors, i.e., the outside tracks on a ½ inch tape, for example, are connected to nonadjacent inputs of error correction code apparatus. Additionally, the input-to-track relationship of various code apparatus can be scrambled, either permanently or during a tape transducing operation. The above permutations provide best advantage with selected error correction codes and systems having identifiable probability of error patterns.

26 Claims, 12 Drawing Figures

ENCODING

DECODING

RECORD FORMAT

ERROR DETECTION SYSTEMS

BACKGROUND OF THE INVENTION

The present invention relates to error detection and correction systems and those error detection systems particularly useful with signal transfer systems, such as those including a magnetic digital recorder, no limitation thereto intended.

To ensure correctness of data signals recorded onto and recovered from a record system, such as a magnetic tape subsystem, error detecting and correcting codes have long been used to detect and correct errors inadvertently introduced into data signals. As recording densities continue to increase, the probability of inadvertently introducing errors into data signals correspondingly increases. To counteract such error rate increases, enhanced error detection and correction systems have been utilized to ensure data integrity. For example, the Sellers, Jr., U.S. Pat. No. 3,508,194 shows a parity error correcting system combined with CRC and LRC error detecting systems to ensure data integrity. While this system is useful for detecting and correcting errors at certain record densities, additional error correcting and detecting capability is required at yet higher densities. For example, the above-referred-to Sellers, Jr., system was used at 800 cpi (cells per inch) NRZI recording. If the recording density is increased to 10,000 cpi or greater, then enhanced error detection and correction systems should be employed.

One approach is to greatly increase the redundancy of the code. This is undesirable because of increased cost in recording and readback circuits to accommodate the complexities associated with increased redundancies. Additionally, space on the media is utilized for error detection and not for data. This defeats one of the main purposes of increasing density, that is, of increasing data rate. Accordingly, it is desirable to minimize the redundancy, yet provide a maximum error detecting and correcting capability.

One such approach is shown by Hinz, Jr., in U. S. Pat. No. 3,639,900 wherein the quality of the readback operations is used for enhancing the error correcting capability of an error correction code. This enhancement, while increasing data throughput, does not necessarily increase the capability of detecting all of the errors; in other words, there may be, in rare instances, a miscorrected error is not detected by the Hinz, Jr., system. Accordingly, further enhancements for detecting errors or ensuring that all errors are detected are required.

SUMMARY OF THE INVENTION

It is an object of the present invention to provide an enhanced error detection and correction system which tends to maximize utilization of check bit redundancy of such systems.

It is another object to provide an enhanced utilization of check bit redundancy in a multicode error detection/correction system.

A first feature of the present invention is applying a nonlinear change to a data field and then applying a first error detection code to the data field itself, and a second error detection code to the nonlinearly changed data field.

A second feature of the invention includes, in a magnetic tape subsystem having a plurality of independent error correction codes, scrambling track inputs between the various code apparatus and the magnetic media for adjusting the data signals such that signals with high probabilities of errors reside in different subfields of the various error correction codes.

A third feature is to permute data to error correction code relationship in a manner to reduce the probability of miscorrected errors. This includes directing those portions of the data field having the greater probability of error to the code apparatus in a manner that the apparatus via the mathematical rules of the error correction code accommodates errors within such portions with a maximum correcting efficiency.

In accordance with the first feature, in a signal transfer system, a first error correction coding system (ECC-1) generates a first check bit redundancy based upon data to be transferred. The data to be transferred is then encoded in a nonlinear encoder or nonlinearly changed in another manner. The nonlinearly changed data is then applied to a second error detection code (ECC-2) to generate a second check bit redundancy. The nonlinear changed data is then transferred, together with the two check bit redundancies. At the receiver, the transferred data is decoded in a nonlinear manner to regenerate the original data. The first error correction code (ECC-1) then operates on the decoded data for generating the first check bit redundancy such that it can be compared with the transmitted first check bit redundancy. The data decoded is then re-encoded in the same nonlinear manner and applied to the second code (ECC-2) to regenerate the second check bit redundancy for comparison with the second check bit redundancy transferred with the data. The correctness of the data is ensured by comparing the two redundancies.

In a modification of the above system, the first error correcting code (ECC-1) can operate on segments of the data as it is transferred through the encoder; while the second code (ECC-2) operates on a group of such segments. Additionally, a third error detection code (ECC-3) is employed which checks all of the data signals in such groups of segments. The second and third error detection codes form a segment of data checked by the first error correction code. The latter system is particularly applicable to a multitrack magnetic tape subsystem.

When applied to a magnetic tape subsystem, the track arrangement on the tape can be applied in a first manner to ECC-1, with the tracks being applied through a permutation switch to ECC-2 and ECC-3 such that the data-to-code relationships are varied by such track permutation. This arrangement is particularly advantageous when the probability of errors of the tracks varies from one track to another, i.e., tracks are electrically interdependent. Error detection and correction is enhanced by "matching" those tracks with a greater probability of error (failure mode) to the error codes so most errors are handled by the error codes in one of their more powerful error detecting and correcting manners.

The above arrangement is particularly useful in a magnetic tape subsystem wherein recording occurs in a first direction of relative motion between the media and the transducer, and readback can occur in either direction of relative motion. Such an arrangement requires that the error correction codes be based upon symmetrical or self-reciprocal polynomials. As such, there is a causal relationship between the various polynomials as to the detection of data errors. By scrambling or rotating the track-to-code relationships, the probability of an undetected error is decreased in an environment where certain types of errors may occur more frequently than other types. That is, failure modes of the system are identifiable to a certain extent.

The foregoing and other objects, features, and advantages of the invention will be apprent from the following more particular description of a preferred embodiment of the invention, as illustrated in the accompanying drawing.

THE DRAWING

DETAILED DESCRIPTION

Figure 1:
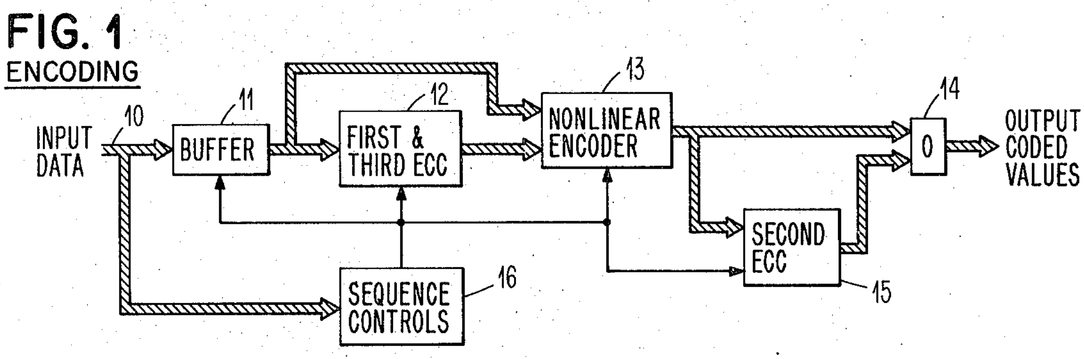
FIG. 1 is a simplified block diagram of a system employing the present invention.

Referring now more particularly to the drawing, like numerals indicate like parts and structural features in the various diagrams. Referring first to FIG. 1, input data signals to be transferred through a signal transfer system, such as a magnetic tape recorder, received over cable 10, accumulate in buffer 11. Buffer 11 stores at least 56 bits of binary data, for example. Buffer 11 then supplies the accumulated data as a segment of data bits to first and third ECC circuits 12 for generating first and third check bit redundancies and also supplies the same 56 data bits to nonlinear encoder 13. The first error detection and correction code circuits can be that shown by Bossen in his U.S. Pat. No. 3,629,824. This error correction system provides a 16-bit redundancy field for the 56-bit data field yielding a 72-bit data segment to be transmitted. The Bossen code is applied to successive ones of the 56-bit data fields yielding a block code system for transferring the data such as shown in FIG. 3.

Figure 3:
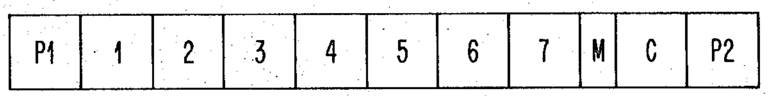
FIG. 3 is a simplified showing of a format arrangement for use on a magnetic tape subsystem when employing the FIGS. 1 and 2 illustrated apparatus.

FIG. 3 shows the data segment fields suitable with a magnetic tape subsystem wherein data is recorded in records separated by interblock gaps, as is well known. The left-hand end portion of the record format is a synchronizing block of signals P1, while the right-hand end portion is a second block of synchronizing signals P2.

These segments are usually referred to as preamble and postamble in magnetic tape subsystems, respectively. The 56-bit data fields, together with the 16-bit check bit fields, are recorded as data segments 1–7 in the illustrated record. At the end of the seventh data segment, a marker segment M is recorded. A check bit field C follows the marker field M and includes the check bit redundancies from the second and third check bit fields as will be described. Accordingly, the record format includes a plurality of data segments, eaqch of which contains its own independent error correction code. Additionally, the record format includes second and third error detection codes operable upon the entire record.

Returning now to FIG. 1, nonlinear encoder 13, constructed in accordance with Irwin U. S. Pat. No. 3,624,637, converts the 56-bit data field and the 16-bit check bit field into 18 four-bit code values, each value having a five-bit field. The encoded data is indistinguisable between the data and check bit fields. Output coded values are supplied through OR circuit 14 as output signals for transmission over a communication line, recording on a magnetic tape system, a disk file, or the like. Additionally, encoder 13 supplies nonlinearly encoded data to second ECC circuits 15 which generates a second check bit redundancy field in accordance with the output coded values. Second ECC circuits may be constructed in accordance with Sellers, Jr., Patent No. 3,508,194. Accordingly, the second ECC checks for errors in all of the data fields plus the check bit redundancies generated by the first ECC. Upon completion of generating the group of record segments, second ECC 15 supplies its check bit redundancy field as a coded value through OR circuit 14. The second check bit redundancy is preferably encoded as taught by Irwin, supra.

Additionally, a third ECC, which also may be constructed in accordance with the Sellers, Jr., Patent No. 3,508,194, checks all of the data fields in each group of record segments to generate a third check bit redundancy. The third check bit redundancy is supplied through nonlinear encoder 13 and, in turn, is checked by second ECC 15.

The above-described operations are suitably controlled by a set of sequence controls 16 which may be timed by the rate of the input data received over cable 10. In the alternative, sequence controls 16 may have their own timing control with buffer 11 accommodating any rate changes between the input data and the operation of the illustrated apparatus. Sequence controls 16 may be an I/O controller in a magnetic tape system such as that described by Irwin in Patent 3,654,617. The I/O controller shown in Sellers, Jr., Patent 3,508,194 also could be used. Additionally, the illustrations in FIGS. 8–12 can be used in combi ıation with the Irwin Patent 3,654,617.

Figure 2:
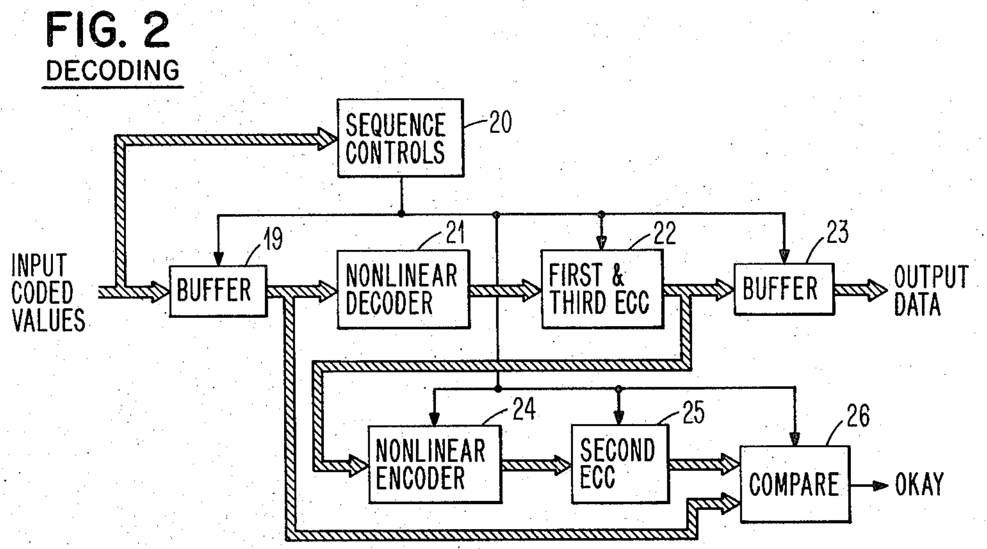
FIG. 2 is a simplified block diagram of a receiver employing the present invention and operable with the FIG. 1 illustrated encoding transmitter.

The output coded values, when transmitted through a communication link or recorded on a magnetic recording media, are recovered as input coded values to be detected by the FIG. 2 illustrated receiver. In this system, the input coded values drive the sequence controls 20, such as the self-clocking readback system, FIG. 12. Additionally, the input coded values are accumulated into segment groups by buffer 19. The coded values then travel to nonlinear decoder 21 which reconverts the coded values into data and check bit signals.

These signals drive first and third ECC circuits 22 for regenerating the first and third check bit redundancies as described for FIG. 1. Upon completion of the error correction operations, circuits 22 supply the data signals to buffer 23 for retransmittal as output data to a connected system (not shown). Also, circuits 22 supply the data signals and the first check redundancy signals to nonlinear encoder 24 for re-encoding the detected data in the same manner that encoder 13 of FIG. 1 encoded output coded values. These recoded values from encoder 24 then drive second ECC circuit 25 for generating a duplicate second check bit redundancy to be compared with the second ECC 15 generated check bit redundancy supplied in the output coded values. Upon completion of the data transfer, compare circuit 26 compares the second ECC 25 generated check bit redundancy with the check bit redundancy received from buffer 19. If they are the same, an okay signal is supplied for use, as is well known in the data communications arts. Additionally, third ECC circuits 22 can include a compare circuit for comparing the third check bit redundancies for ensuring that the decoded data from decoder 21 compares with the data signals supplied to encoder 13.

Accordingly, as shown in FIGS. 1 and 2, the encoded values are checked by a second ECC code for ensuring the reliable transmission of output coded values through a data transmission system, including decoding and re-encoding. Such an operation provides maximum insurance that all circuits in a data transfer system are operating properly. Additionally, a third ECC checks the same group of data segments with only the data signals before encoding and after decoding to ensure proper comparison of the data signals. This action provides a data field to a first error correction code for detecting any errors therein, then applying a nonlinear operation on the checked data field to generate a second nonlinearly related data field. The second data field is then checked by a second error code. With the nonlinear difference between the two codes, a high degree of reliability is provided in that the probability of an error condition residing in the same mathematical subfield of the two codes becomes highly remote.

Additionally, first error correction code ECC–1 includes error correcting capabilities in addition to error detecting capabilities. The second and third ECC's (error detection codes) not only check the data but also the corrections performed by the first error correction code. As seen in FIG. 2, second ECC 25 is driven by the output signals of the first ECC 22 which in turn encodes the error corrected data, ensuring proper corrections of data.

Figure 4:
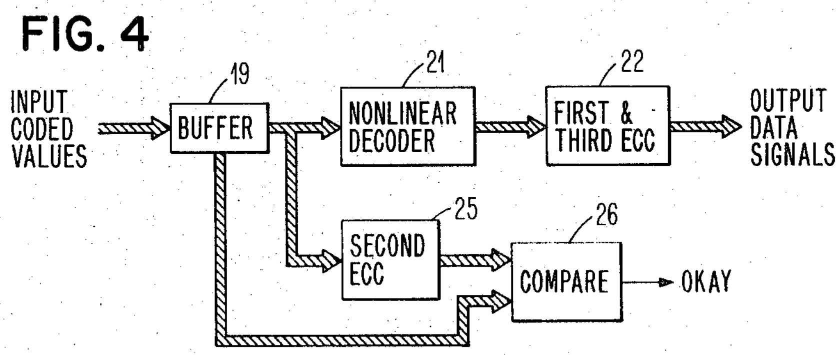
FIG. 4 is a simplified logic diagram of a modification of a decoding system usable with the present invention.

When the reliability of the system need not be as great as provided by the FIG. 2 illustration, the FIG. 4 illustrated receiver apparatus may be employed for cost-reduction purposes. In this system, buffer 19 supplies the output coded values to nonlinear decoder 21 as before. Nonlinear decoder 21 supplies the decoded data to first and third ECC's 22, which then supply the error corrected data as output data signals. Second ECC is generated directly off buffer 19 rather than off the re-encoded values from encoder 24. The output signal of second ECC is then compared with the received second check bit redundancy by comparator 26 for generating an okay signal. The FIG. 4 illustrated apparatus does not check the error corrections made by the first ECC.

In a magnetic tape subsystem, many of the error detection and correction codes have assumed that there is track independence from one record track to another. The present invention teaches that this is not necessarily the case. For example, referring to FIG. 5, the track arrangements on a typical one-half inch tape are shown, tracks 4 and 5 being the so-called outside tracks. It has been shown that tracks 4 and 5, because of tape curl, lift-off, skew, and the like, exhibit the highest probability of an error in the recording system. Compare this with the inside tracks which exhibit the lowest probability of error, that is, tracks 1, 2, and 8. Tracks 0, 3, 6, and 7 exhibit probabilities of errors between that of tracks 4 and 5 and the center three tracks. Accordingly, from an error detection and correction view, tracks 4 and 5 having the greatest probability of errors, even though widely spaced apart, in one sense are not mathematically independent. Also, it has been found that defects on the media, such as voids in the magnetic surface, dust particles, and the like, may extend to two adjacent tracks. For example, a single dust particle may cause a low-quality signal in both tracks 1 and 2 indicating that such adjacent tracks are not truly independent as has been assumed in error detection and correction systems of prior art systems. Accordingly, it is advantageous to apply this knowledge in enhancing the utilization of check bit redundancies.

For example, the output coded values from FIG. 1 are recorded on the tape 27 as at 28. At some time later, or during the same operation, the output coded values are sensed by a transducer (not shown) at 28A and supplied as input coded values to buffer 19 of FIG. 2. The transducer-to-tape relationship will always be maintained in accordance with the illustrated track arrangement on the magnetic tape. Track-to-code relationships are varied within the transmitter (recorder of FIG. 1) and receiver (FIG. 2) to enhance error detection, as will become apparent.

It has been found that if adjacent tracks and the outside two tracks having a high probability of error are never supplied to adjacent inputs to error correction code apparatus, as described herein, i.e., mathematically to adjacent terms of the polynomial defining the error correction code, then the probability of performing a proper error correction is enhanced. Error detection and correction apparatus exhibiting the above-mentioned characteristics include those using a plurality of codes, each code having a "$1+x$" term in the code polynomial. The Sellers, Jr., U.S. Pat. No. 3,508,194 illustrative embodiment uses such a code, for example. Also, related error detection codes that have other similarities may also exhibit similar characteristics.

Additionally, as above described, by permuting the relationship between the tracks and the various error correction codes, the probability of detecting miscorrected errors is also enhanced. Accordingly, in accordance with the present invention, the track-to-code relationships shown below in Table I are adapted to a tape subsystem to enhance its operation.

TABLE I

| Track | 5 | 7 | 3 | 8 | 2 | 1 | 0 | 6 | 4 |
|---|---|---|---|---|---|---|---|---|---|
| ECC-1 | $2^2$ | $2^5$ | $2^8$ | $2^0$ | $2^4$ | $2^7$ | $2^1$ | $2^3$ | $2^6$ |
| ECC-2 | $2^6$ | $2^8$ | $2^4$ | $2^0$ | $2^3$ | $2^2$ | $2^1$ | $2^7$ | $2^5$ |
| ECC-3 | $2^3$ | $2^4$ | $2^7$ | $2^5$ | $2^8$ | $2^6$ | $2^2$ | $2^0$ | $2^1$ |

Figure 5:
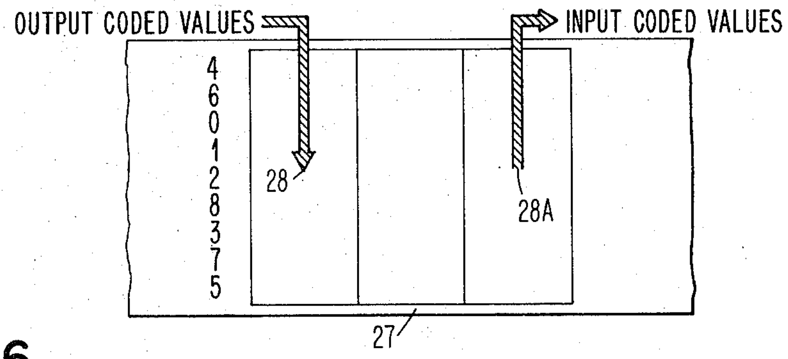
FIG. 5 is a simplified diagrammatic showing of how the invention relates to data recorded on a magnetic media.

In the above table, the tracks are in accordance with the FIG. 5 arrangement. The ECC 1–3 inputs show the digit position of the shift register or Exclusive Or tree corresponding to the track on the media. Note that none of the tracks are inputed to the same polynomial of the CRC's, i.e., ECC–2 and ECC–3. The parity track 8, i.e., the most reliable track, is supplied to the lowest digit position of the error correcting code for reducing the number of shifts for that track. This is done because the parity or error check bit signal in track 8 (the parity track) is specially handled, as is well known. Also note in ECC–1, the error correcting code, all adjacent tracks have a relationship to ECC–1 polynomial that is nonadjacent, i.e., the polynomial exponents are not successive for any pair of adjacent tracks. For example, tracks 5 and 7 are respectively connected to the $2^2$ and $2^5$ inputs of ECC–1. Particularly note that tracks 4 and 5 (the outside tracks) are widely separated on the input portion of ECC–1 to the $2^6$ and $2^2$ inputs.

The above table illustrates the preferred track arrangement for three error detection and correction codes. Other combinations may be substituted for that shown in Table I so long as the principles of the invention are followed. By causing different permutations between the encoding and decoding, various data sets and subdata sets among various error codes, different track relationships, may be desired. Premultiply (shift) techniques with a modified feedback network may alter the actual connections while obtaining the same result. This arrangement may be found in those systems where compatibility with the standard nine-track NRZI systems which employ an all-0's input and shift at the end of each record. Since this aspect, per se, forms no part of the invention, it is not further described. It is, however, usable to practice the present invention.

It has also been found that improper corrections are more probable when adjacent tracks are in error. Accordingly, by separating the tracks in ECC–1, the probability of an improper correction is reduced.

Figure 6:
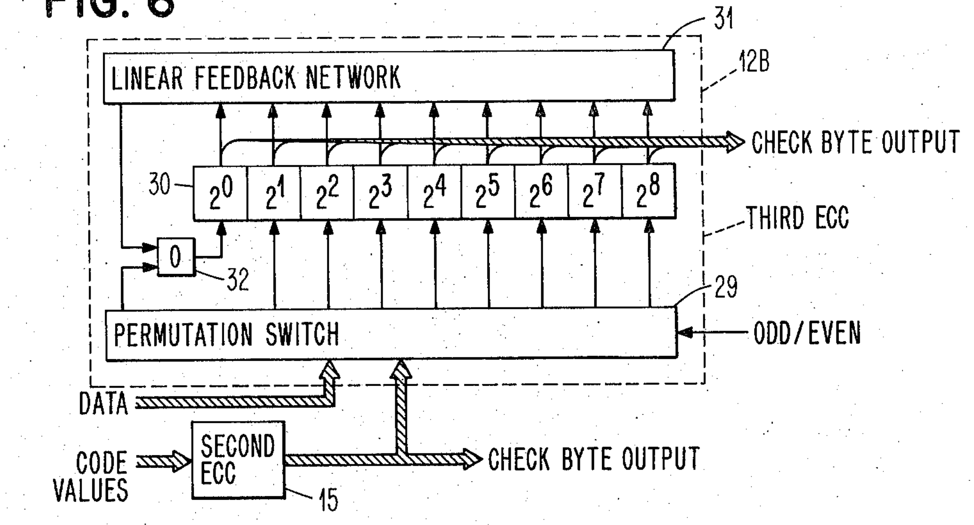
FIG. 6 is a simplified logic diagram of error correction encoders or decoders using cyclic redundancy check shift register code generators.

Turning now to FIG. 6, a typical error correction circuit for the third ECC circuit 12B is shown in simplified detail form. Details of construction may be in accordance with either the Sellers, Jr., patent supra or the Bossen patent supra. Data is supplied through permutation switch 29 to shift register error code generator 30. This register is constructed in accordance with the Sellers, Jr., patent supra. Linear feedback network 31 receives selective inputs from shift register 30 for providing linear feedback shift register sequences to OR circuit 32 to generate the check bit redundancy. Upon completion of transferring all of the data, a check byte output is supplied from register 30 as above described. Additionally, the encoded values, i.e., the output code values, are supplied to second ECC circuit 15, which is constructed as shown for third ECC encoder 12B. It also supplies its check byte output to be recorded and also supplies it to permutation switch 29. Permutation switch 29 for third check byte encoder 12B is constructed to transfer the tracks as shown in Table I to ECC-3. This switch may be a pinboard or any type of electronic switch.

For providing further changes in the coding, successive segments, i.e., the 56-bit data segments, may be defined as being odd and even. Permutation switch 29 then can be switched from one track permutation to another in accordance with whether the segment is odd or even. This introduces an additional linear change in the relationship between the data fields and the error code polynomial such that a long burst of errors will be switched between various terms of the polynomial.

Figure 7:
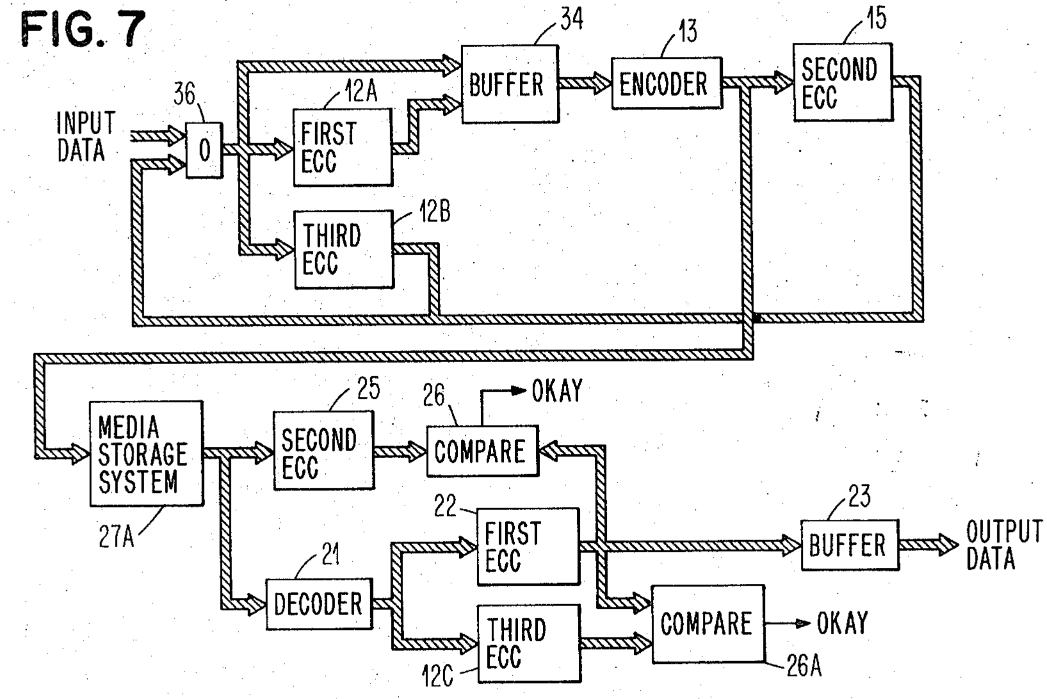
FIG. 7 is a simplified logic flow diagram of a practical embodiment of the present invention.

FIG. 7 shows a second, but preferred, arrangement for encoding and decoding data and generating and verifying check bit redundancies in accordance with the present invention. First ECC circuit 12A, constructed in accordance with the Bossen patent supra, generates the 16-bit check bit redundancy for each of the 56 data bits. The data bits, plus the check bits, are received by buffer 34 in preparation for encoding by encoder 13. Encoder 13 then supplies the encoded output values to second ECC circuit 15. Upon the completion of the record, second ECC circuit 15 and third ECC circuit 12B supply their respective check bit redundancies through OR circuit 36 to first ECC circuit 12A. Such check bit redundancies may be repeated to complete a 56-bit data segment. First ECC circuit 12A then generates the first check bit redundancy based upon the second and third check bit redundancies. Then all three redundancies are supplied to encoder 13 for transmittal as output code values to the media storage system 27A. In this manner, the first ECC circuit 12A can correct errors introduced into the second and third check bit redundancies for ensuring proper checking of errors in each data record. Details of how this is accomplished are described with respect to FIGS. 8–12.

Media storage system 27A supplies signals read back from storage to decoder 21 for translation from the storage code into four data and check residue byte groups. First ECC 22 and third ECC 12C operate as previously described on the received data bytes. First ECC 22 corrects data bytes in error, including the bit pattern generated by second and third ECC's 15 and 12B of the recording portion of the system.

First ECC 22 supplies the corrected data to buffer 23 as output data signals. Upon the completion of the record, first ECC 22 supplies corrected check bit residues received from system 27A to compares 26 and 26A, respectively, for comparing such received check bit redundancies from system 27A with the ones generated respectively in second and third ECC's 25 and 12C. If the comparison is favorable, respective okay signals are supplied by compares 26 and 26A.

The first ECC residues are received by first ECC circuit 22 to correct any errors in the data and second and third ECC residues. Note that in this embodiment, second ECC 25 and third ECC 12C do not receive the corrected data from first ECC 22. In the alternative, first ECC 22 can supply the corrected data signals to second ECC 25 via a nonlinear encoder 24, as shown in FIG. 2, and directly supply the corrected data bytes to third ECC 12C. Selection of such arrangements is one of design choice. In addition, other connections between the various error detection and correction circuits can be envisioned within the scope of the present invention. Such design choices will vary in accordance with the designer's goal as to reliability, cost, throughput, and the like.

ILLUSTRATIVE EMBODIMENT OF THE INVENTION

Figure 8:
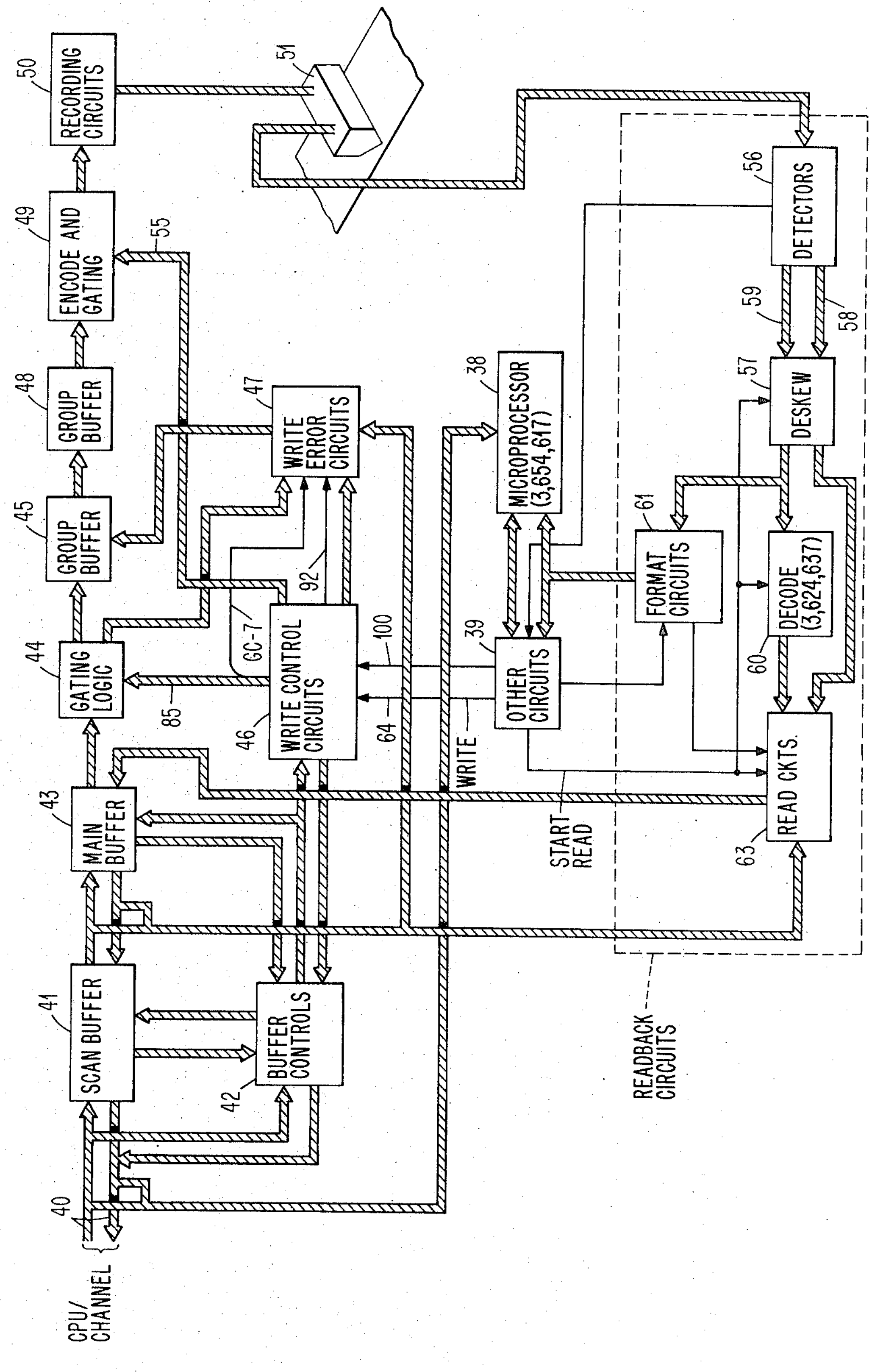
FIG. 8 is a simplified logic block diagram of a magnetic tape subsystem employing the present invention.

Referring next to FIG. 8, an I/O system for a magnetic tape recorder is shown in simplified diagrammatic form, some connections have been omitted for purposes of clarity. Such connections are either ascertainable from the description of related figures or so well known, or are design choices, that description would not benefit an understanding of the invention. Microprocessor 38 constructed in accordance with Irwin U.S. Pat. No. 3,654,617 controls the system. Additionally, other known circuits 39 in FIG. 8 sequence controller operation in close coordination with microprocessor 38. Circuits 39 perform supervisory functions such as described in the Irwin Patent '617. Data is received from and supplied to a data channel or CPU via cables 40, as well as control signals between circuits 39 and microprocessor 38, as more fully described in the Irwin U.S. Pat. No. 3,654,617, as well as in the Moyer U.S. Pat. No. 3,303,476 and as widely used by International Business Machines in their data processing systems. A scan-in/scan-out (scan) buffer 41 provides communication between cables 40 and main buffer 43 as sequenced by buffer controls 42. The operational arrangement here is not pertinent to the practice of the present invention.

Figure 9:
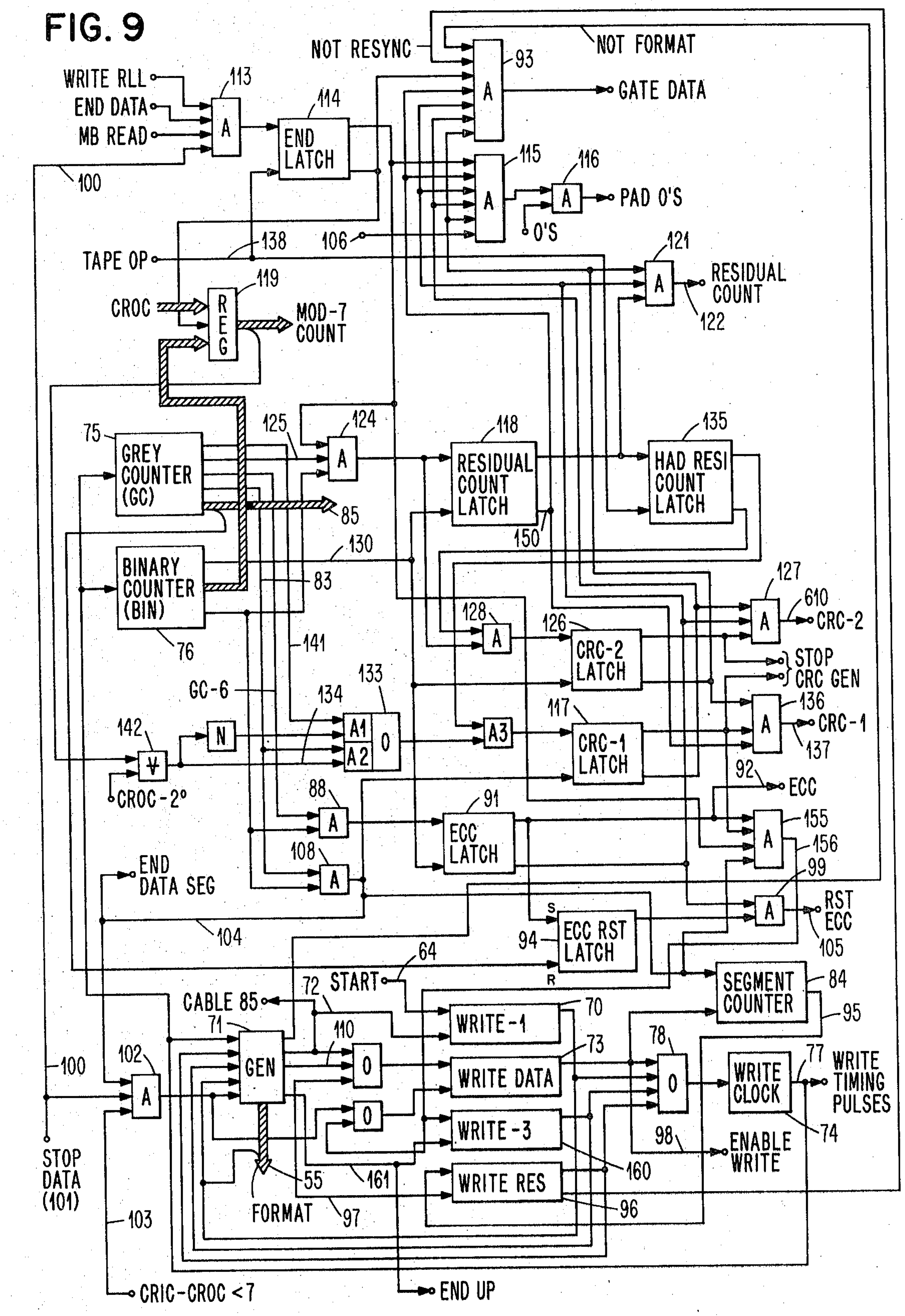
FIG. 9 is a simplified logic diagram of write control circuits usable with the FIG. 8 illustration.
Figure 10:
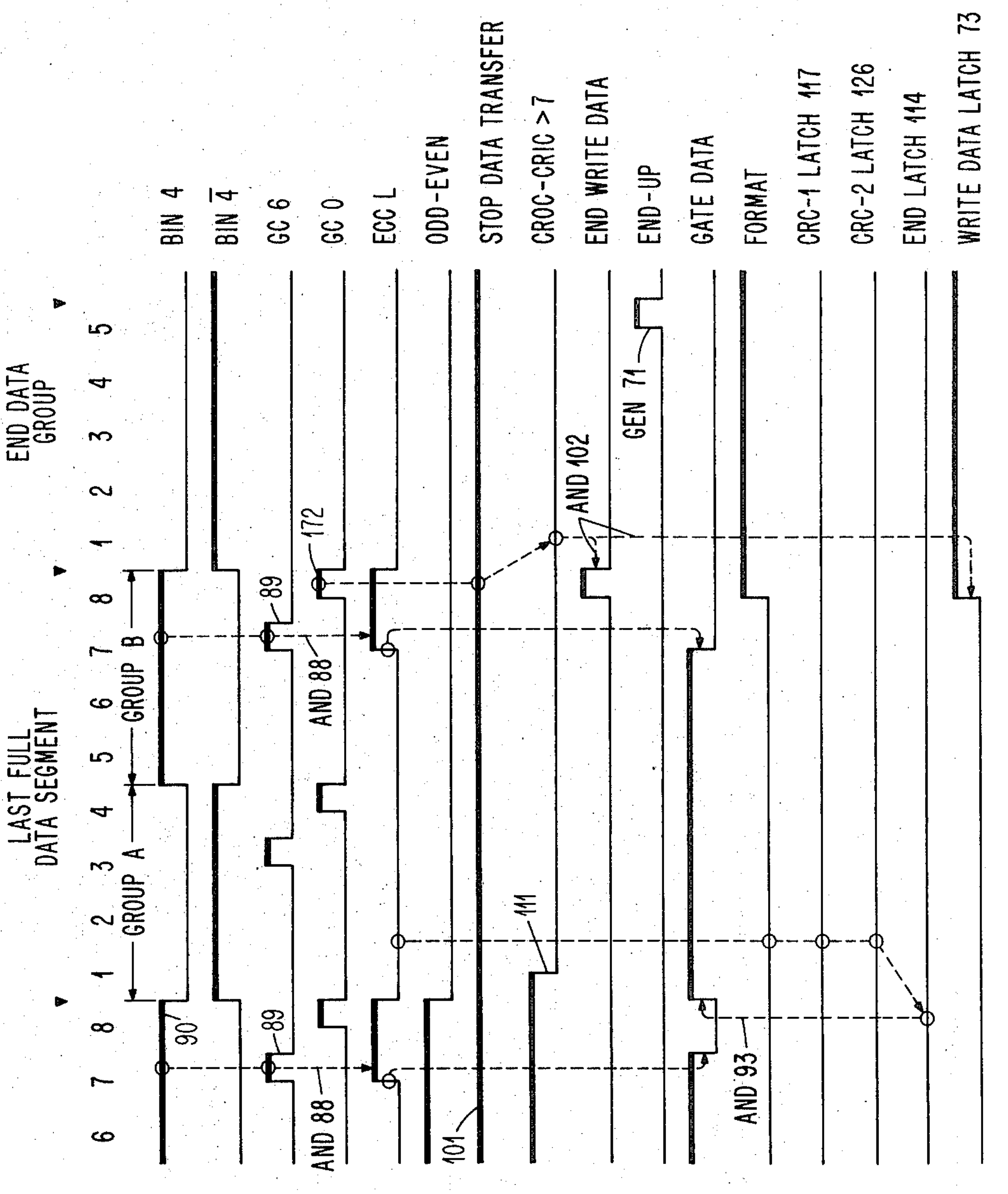
FIGS. 10 and 11 are timing diagrams used to explain the operation of the FIG. 9 illustrated apparatus.
Figure 11:
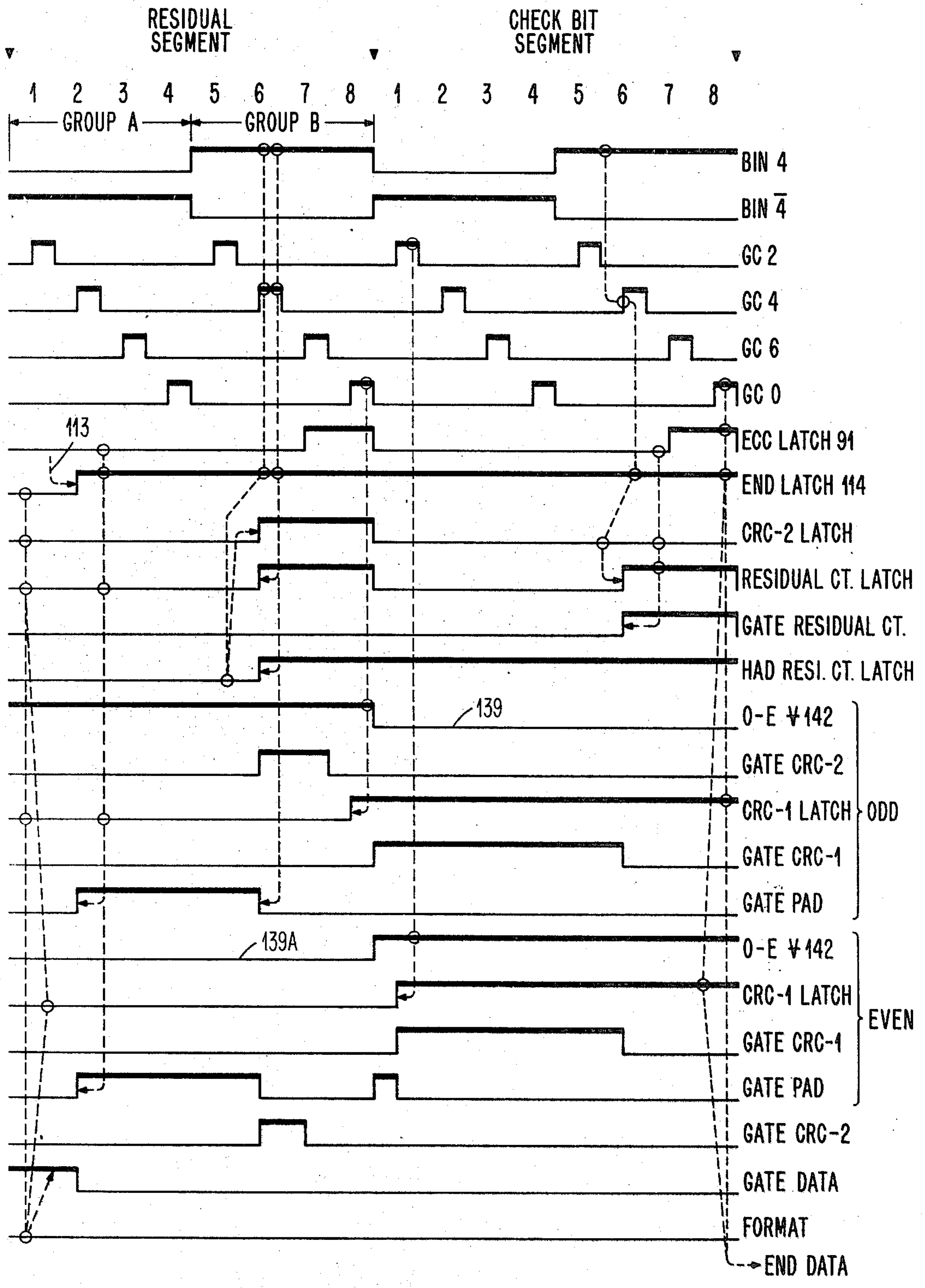

Main buffer 43 preferably has a capacity of about 32 bytes. It is basically a read-in/read-out count-controlled buffer wherein the modulus of the count of a readout counter (CROC, not shown) associated with main buffer 43 sequentially addresses registers in the main buffer, as is well known. Main buffer 43 not only transfers signals to group buffer 45 for recording, but also receives data from read circuits 63 to be transferred over cables 40 to a connected CPU. Write control circuits 46 are supervised by microprocessor 38 and circuits 39 to generate the format on media M. FIGS. 9, 10, and 11 detail this recording operation. Write error circuits 47 respond to signals received through gating logic 44 and write control circuits 46 to generate error detection and correction residues, such as detailed in the Bossen patent, supra. Additionally, CRC–1 and CRC–2 check bytes are generated as described by Sellers, Jr., in U.S. Pat. No. 3,508,194. Group buffers 45 and 48 each receive groups of 28 bits of data and check bit residues respectively denominated as Groups A and B. These group buffers supply the 28 bit groups to encoder-gating (EG) circuit 49. The encoding portions of circuit 49 are constructed in accordance with the Irwin U.S. Pat. No. 3,624,637 for converting the data and residue bits into five-bit storage code group values, each code group value preferably lying along one of several tracks on media M. EG 49 gates signals in a known manner for supplying serially arranged signals for each of nine tracks to recording circuits 50. Circuits 50 include the usual amplifiers and write compensation techniques, such as shown in Ambrico U.S. Pat. No. 3,503,059, and supply recording signals to transducer assembly or head 51 for recording such signals in tracks along media M.

For reproducing signals previously recorded on media M, detectors 56 receive signals from head 51. Detectors 56 include the amplifiers and read compensation, as found in known digital data readback systems. Additionally, detectors 56 generate quality of readback signals as set forth in the Hinz, Jr., U.S. Pat. No. 3,639,900, and supply same over cable 58 to deskewing apparatus 57, synchronously with data signals supplied over cable 59. Deskew apparatus 57 is preferably constructed in accordance with Irwin U. S. Pat. No. 3,623,004 with accommodations being made for the five bit storage coded values in each of the tracks. For example, deskew apparatus 57 may include 32 registers rather than four, as usually found in readback systems for 1,600 bpi (bits per inch) phase-encoded recoding.

Figure 12:
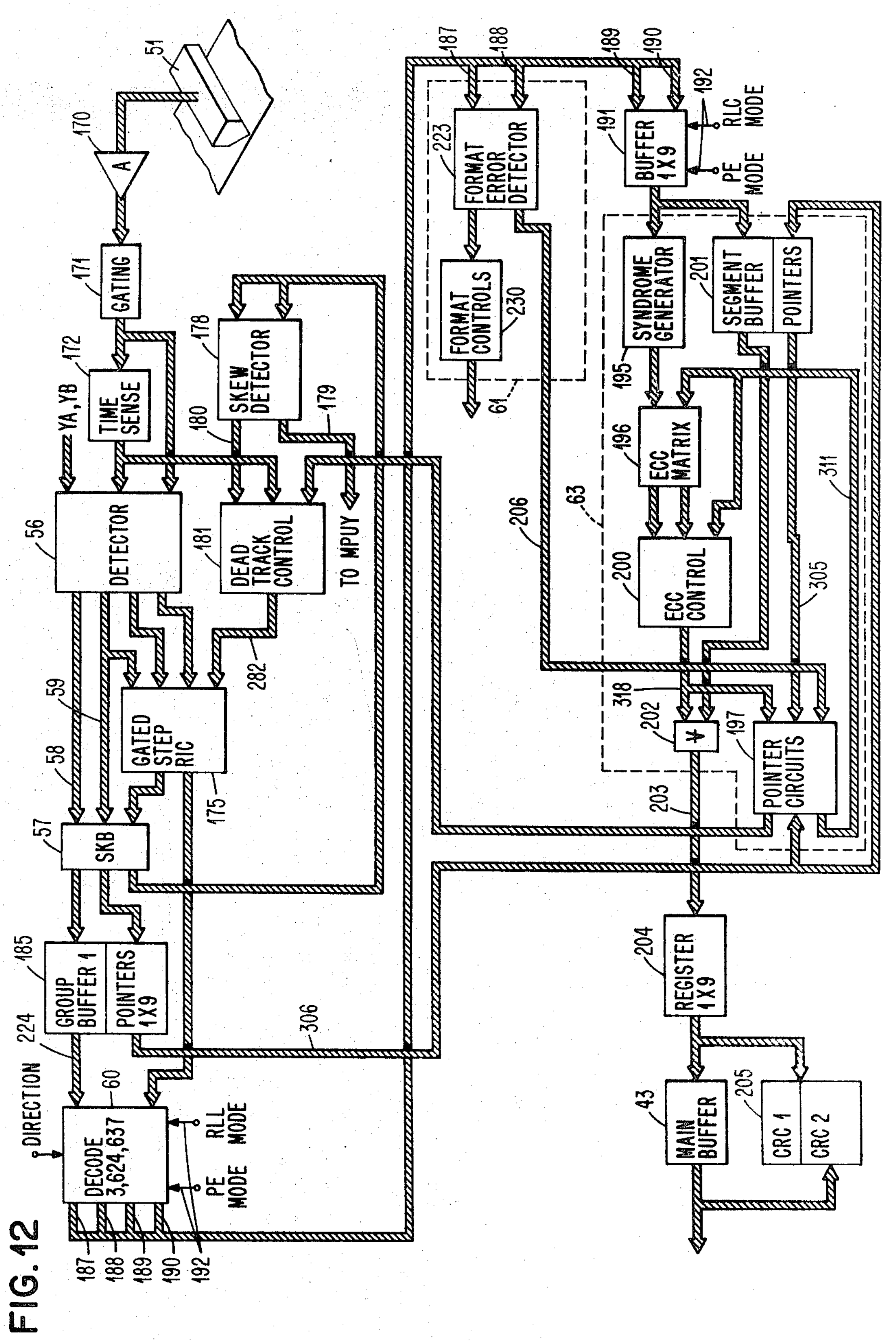
FIG. 12 is a simplified logic diagram of a readback system employing the present invention.

Deskew apparatus 57 supplies signals to decode 60, constructed in accordance with Irwin U. S. Pat. No. 3,624,637. Quality signals are supplied directly to read circuits 63 as shown in FIG. 12. Decode 60 supplies the decoded signals of Groups A or B to read circuits 63 where they are combined with the quality signals for error detection and correction purposes as shown by Hinz, Jr., supra. In the event of an improper five-bit code group being received, decode 60 also supplies a corresponding poor code quality-indicating signal, referred to as a pointer. Additionally, format circuits 61 may respond to selected format groups, used to demark record portions and for starting and stopping data signal transfers during readback. These may include the format groups set forth by Irwin in U. S. Pat. No. 3,641,354. Circuits 61 supply such detected signal permutations to other circuits 39 and to microprocessor 38 for their supervisory action, as is well known.

Read circuits 63 pass correct data signals in repeated bursts of 56 bits to main buffer 43 for retransmission over cable 40 to a connected CPU (not shown).

The above-mentioned format group signals can be generated in write control circuits 46 (or microprocessor 38) and supplied to encoder and gating circuits 49 over cable 55. In the alternative, they may be supplied through gating logic 44 for encoding in five lengths of five-bit run-length limited code groups. It is preferred that microprocessor 38 generate such special signal groups using known computing techniques and supplying same to circuits 50. The techniques described in the Edstrom et al article "Program Generated Recording," IBM TECHNICAL DISCLOSURE BULLETIN, November 1971, Pages 1,821 and 1,822, are preferred to be used in this regard.

A RECORDING OPERATION

Referring next to FIGS. 9, 10, and 11, the detailed operation is described for generating the 56 bit groups. All CPU initiated operations in the illustrated system, including write (record signals on tape) and read (readback or recover signals previously recorded on tape) are initiated by a CCW (channel control word) generated in accordance with the Moyer et al patent, supra, plus Beausoleil et al. U.S. Pat. Nos. 3,336,582 and 3,411,143, and CCW's as shown by King et al. in U. S. Pat. No. 3,550,133. In response to such CCW's, other circuits 39 supply a startwrite signal over line 64 setting write-1 latch 70. The start-write signal is generated in accordance with the Irwin U.S. Pat. No. 3,641,534. Write-1 latch 70 actuates preamble/postamble marker generator 71 to generate, through its own sequence controls, the preamble consisting of format groups. Such preamble generation is shown generally in FIG. 7 of Irwin Patent 3,641,534. Generator 71 differs from the Irwin system to accommodate a different format of preamble, but is well within the scope of one of ordinary skill. In the preferred form, generator 71 is a program of instructions in microprocessor 38 with the signal connections of FIG. 9 being made as taught in Irwin Patent 3,654,617, FIG. 37. The preamble signals are supplied successively in frames of nine signals (hereinafter termed "bytes") over cable 55 through gating circuits 49, thence recording circuits 50. The write-1 signal from latch 70 enables gates (not shown) in logic 44 to pass the cable 55 signals. Upon completion of the preamble, an end-of-preamble signal travelling over line 72 resets latch 70 and stops generator 71, closes cable 55, gates in logic 44 (via cable 85) and simultaneously sets write-data latch 73. Latch 73 then supplies enable write-data signal over line 98 to the data flow portions including buffer logic 42, main buffer 43, gating logic 44, etc., enabling transfer of data signals previously loaded into main buffer 43 (as described with respect to FIG. 1) for generating successive groups of data signals to be recorded on media M. In preparation for recording upon cessation of the actual preamble signals being supplied over cable 55, the end-of-preamble signal on line 72 continues during generation of a format group termed M1, such that an appropriate number of signals is transferred from main buffer 43 through gating logic 44 into group buffer 45 to be encoded by circuits 49.

Write clock 74 synchronizes preamble generation and data recording by a pair of timing counter and pulse distributor counters GC (Grey counter) 75 and BIN (binary counter) 76. Clock 74 is enabled via OR 78 by write-1 latch 70, write-data latch 73, write-3 latch 160, or write-resync latch 96 to supply write timing pulses over line 77 to all circuits, including generator 71, GC 75, and BIN 76.

The timing afforded by counters 75, 76 is first described with respect to generating the last full data segment of a record. Referring now to FIG. 10, in each data segment the periods during which data bytes are transferred from main buffer 43 to group buffers 45, 48 are enumerated from 1 to 7 with an ECC or check bit byte being transferred to buffer 45 from write error circuits 37 during byte period 8. From the group buffers, bytes 1–8 are encoded by encoder 49. The timing of EG circuits 49 and recording circuits 50 is not detailed in this description, such timing being well within one of ordinary skill.

Each byte period has two parts, part one during which the nine bit record byte is actually transferred in parallel and part two, a command portion, during which register selection and command decoding occur. The parts one are represented by odd counts from GC 75 (GC–1 through GC–7, odd only) and the parts two by the even counts from GC 75 (GC–0 through GC–6, even only). One group of four bytes is transferred during each cycle of GC 75. BIN 76 determines which group in a data segment is being transferred, i.e., Group A consisting of four data bytes and first transferred or Group B consisting of three data bytes plus an ECC byte.

The timing relationships between GC 75, BIN 76, and the byte position in the data segments are shown in the table below as well as in FIGS. 10 and 11.

| GC 75 Count | 0 | 1 | 2 | 3 | 4 | 5 | 6 | 7 |
|---|---|---|---|---|---|---|---|---|
| Group A Frames | — | 1 | — | 2 | — | 3 | — | 4 |
| Group B Frames | — | 5 | — | 6 | — | 7 | — | C |

Byte transfers are in odd GC counts, commands are in immediately lower even-numbered GC counts. Commands for GC=1 are in GC–0, for GC=5 in GC–4, etc. Byte 7 in check bit segments is the residual count byte.

In FIG. 10, BIN–4 and BIN–$\overline{4}$ represent the Groups A and B selection during each data, residual, or ECC segment. During format group generation, write clock 74 (FIG. 9) is inactive leaving BIN 76 at all 0's, such as during the END DATA group in FIG. 10. Accordingly, throughout the present embodiment, all format groups are treated as Group A's, even though successive format groups occur.

In data transfers, for example, in byte period 1, a byte is transferred into group buffer 45, position 1. In the first half of byte period 2 (GC=3), a second byte is transferred into group buffer 45, byte position 2, etc., through byte position 4. This action loads Group A signals into buffer 45 and simultaneously supplies the data signals to write error circuits 47 to generate the ECC or check bits. Buffer 45 then being filled transfers such signals to buffer 48 awaiting calculation of the check byte C. Simultaneously with the translation of the first four bytes of the segment, data bytes 5, 6, and 7 are transferred into group buffer 45 and byte 8 from write error circuits 47 in a similar manner. AND 93 supplies the gate-data signal to logic 44, as will become apparent. Byte 5 is transferred into buffer 45 position (not shown) 1, byte 6 into 2, byte 7 into 3, and byte 8, the error correction byte from circuits 47, is transferred into buffer position 4, while the track-8 bit positions were filled by circuits 47 in group buffer 48 substantially simultaneously with data transfers, as will become apparent. Fifty-six bits are now ready to be recorded.

The GC–0 pulse on line 83 signifies the end of a group and steps counter 84 in the same manner that a byte counter was incremented in Irwin U.S. Pat. No. 3,641,534, see FIG. 6 of that patent. The tally in counter 84 indicates the number of data groups transferred through buffers 45 and 48. Since GC 75 is not active during format groups, counter 84 tallies only data, residual, and check bit signal groups. The residual group contains less than four bytes of data or check residues. Padding bits complete the 56 bit total of bits to be recorded. Such 56-bit total is also termed a record segment consisting of Groups A and B. The check bit segment may contain ECC–2 and ECC–3 residues. GC 75 supplies the gating logic 44 control signals over cable 85 to commutate main buffer 43 supplied data bytes to buffer 45 byte positions. Such commutation of data signals is so well known it will not be further described.

Binary counter (BIN) 76 is a three-bit counter counting bytes 1–8 of each data, residual, and ECC segment. It is inactive during format group generation. During data group generation, the most significant digit, 4, indicates the Group A (BIN–$\overline{4}$) and Group B (BIN–4) data transfers as best seen in FIG. 10. For each byte 8, the BIN–4 and GC–6 signals combine to degate data transfer and enable ECC byte transfer. In this regard, AND 88 is jointly responsive to GC–6 signal 89 and BIN–4 signal (see signal tie lines in FIG. 10) to set ECC latch 91 (latch=LTH). ECC LTH 91 (ECC–1) being set, supplies a gate-ECC signal over line 92 to circuits 47 and gating logic 44 for transferring the circuits 47 generated ECC byte into group buffer 45, byte position 4, during byte period 8 of each data, residual, and ECC segment. Simultaneously, ECC LTH being set, disables AND circuit 93 inhibiting data transfer between main buffer 43 and group buffer 45. The gate-data signal from AND circuit 93, as seen in FIG. 10, results from not-end LTH, not-ECC LTH, not-residual LTH, not-CRC–1 LTH(CRC–1 = ECC–2), not-resync, not-format (generator 71) AND not- CRC–2 LTH (CRC–2 = ECC–3) to gate data (hereinafter, ECC refers to ECC–1, and CRC denotes ECC-two-thirds. Advantages of this "negative" approach to gating data will become apparent from a continued reading.

ECC LTH 91 set and GC–7 pulse are combined in write error circuits 47 to transfer the ECC byte to buffer 45. This action occurs during the first half (GC–7 and BIN–4) of byte period 8 after being commanded during the second half of byte period 7 (GC–6 and BIN–4). Upon ECC–1 byte transfer, the error circuits are reset during both recording and readback. A reset signal on line 105 resets ECC–1 circuits at the end of each data or record segment. The ECC LTH signal on line 91 sets ECC reset LTH 94. Then, AND circuit 99 responds to ECC LTH 91 being reset by BIN–4̄ (a new record segment is starting) to read circuits 63. The beginning of the next segment (GC–1) resets ECC RST LTH 94.

The above-described operation is repeated for each data segment being transferred from cable 40 to media M. Segment counter 84 tallies the number of segments generated by dividing the number of GC–0 pulses on line 83 by two. Upon reaching a predetermined number of segments, in accordance with Irwin U.S. Pat. NO. 3,641,534, the resync burst should be written. This resync burst can be generated by preamble/postamble generator 71 as shown in FIG. 7 of Irwin U.S. Pat. No. 3,641,534. Upon detection of a predetermined number of segments having been recorded, counter 84 supplies a resync pulse over line 95 setting write-resync latch 96. This action turns off AND 93 (drops gate-data) and enables clock 74, as well as initiating operation of generator 71 to generate a resync pattern in accordance with Irwin U.S. Pat. No. 3,641,534. Upon completion of the resync pattern, that is, during the generation of marker group M1 as mentioned for the preamble marker M1, preamble generator 71 supplies an end-of-resync pulse over line 97 resetting write-resync latch 96 and again setting write-data latch 73. The end-of-resync pulse is generated in the same manner of the K=34 as shown in FIG. 7 of Irwin U.S. Pat. No. 3,641,534.

The next group of record segments is then recorded as above described. The write-data enable signal is not only supplied to clock 74, but also to other portions of the data flow over line 98 and also enables segment counter 84 to again count the number of record segments being recorded. The above procedure may be repeated several times during each record, once or not at all if the number of segments does not exceed the predetermined number.

A command out (CMDO) channel command (see Moyer et al., supra) received over cable 40 (FIG. 8) from the controlling CPU instructs microprocessor 38 and circuits 39 to set a stop-data-transfer LTH (not shown) for terminating the data recording operation. Other circuits 39 supply the stop-data-transfer signal 101 (FIG. 10) over line 100 to condition AND circuit 102 for ending the record. AND 102 is responsive to a later described "last segment of data in buffer 43" signal received over line 103 from buffer controls 42, end-segment signal on line 104, and signal 101 to actuate generator 71 to generate an all-1's end-data signal group. AND 108 combined GC–8 on line 83 and BIN–4 signal to generate end-segment signal for effecting the action during the last command period of a data segment time and when there are less than seven data bytes or less than a full data segment to be recorded in main buffer 43 (indicated by line 103 signal). Generator 71 then supplies one group of all 1's over cable 55 for recording. AND circuit 102, when activated (see FIG. 10, end-data signal), also resets write-data latch 73. At this time, clock 74 is disabled preventing further data transfers through gating logic 44. Gate data AND 93 remains enabled until the last data byte has been transferred from main buffer 43 to group buffers 45, 58. Upon completion of recording the all-1's end of data marker group, generator 71 sets write-data latch 73 by a setting signal supplied over line 110. End-up pulse is supplied over line 161 to microprocessor 38 and other portions. This pulse signifies that the terminator portion, i.e., residual and ECC segments, plus postamble, is to be recorded and processor 38 should prepare to terminate the recording operation as described in Irwin U.S. Pat. No. 3,641,534.

The last full data segment is indicated from the buffer 43 controls that less than seven bytes remain in the buffer, as at 111 in FIG. 10. This signal is received by AND 102 (FIG. 9) over line 103 from buffer controls. In the present illustration, the residual count (number of data bytes in the residual segment) is two (binary 010). AND 102 generates end-write-data signal (FIG. 10) during the last half of byte period 8 of the last full data segment as shown in FIGS. 9 and 10. End-write-data actuates generator 71 to generate the end-data group (FIG. 10) of all 1's in all tracks and simultaneously resets write-data latch 73. This, of course, turns write clock 74 off during generation of end-data group.

Upon generating end-data group, generator 71 supplies an actuating signal over line 110 setting write-data latch 73 for generating the residual and ECC segments as shown jointly by FIGS. 9 and 11.

The first portion of the residual segment is generated as a data transfer as just described. In the illustration, there are two data bytes to be recorded, hence the first portion consists of byte periods 1 and 2. Data bytes from main buffer 43 are transferred into group buffer 45, byte 1 and 2 digit positions. After transferring the second byte during the first portion of the second byte period of the residual segment, AND circuit 113 responds to buffer 45 is empty signal on line 106 signal, to the stop-data-transfer signal 100, the write mode RLL signal (not shown) received from processor 38, and read buffer cycle signal from buffer controls 42 to set end latch 114. End latch 114 being set signifies that all data received over cable 40 has been transferred into buffer 45. Being set, it degates data AND circuit 93. End latch 114 becoming active also captures the image in binary counter 76 in register 119 for later use as part of the residual count byte. This register also retains the image of CROC (buffer 43 read-out counter) at the time the last byte is transferred out of main buffer 43. Register 119 includes special decoding circuits (not shown) correcting an all-1's condition to all 0's. In the event there are no data bytes in the residual data segment, register 119 contains all 1's reflecting transfer to the check bit byte C. It is desired to have the count 0–6, hence the all 1's is converted to all 0's representing no data bytes in the residual segment.

AND 113 is not timed by GC 75 because the number of residual data bytes after the last full data segment varies from 0–6. Hence, end latch 114 can be set, depending on the number of residual bytes any time from bit period 8 of the last data segment (residual count=0) until byte period 6 of the residual segment (residual count=6).

Returning to the illustration of two residual bytes, byte positions 3–6 should now be filled with padding signals, preferably all 0's. To this end, AND circuit 115 generates a gate-pad signal 120 (FIG. 11) for transferring 0's through AND circuit 116 to the GC 75 designated byte registers in group buffer 45. Padding signals are gated whenever no other gating signal is active. That is, AND circuit 115 is jointly responsive to end latch 114 being set to the active condition and the other gating latches 118, 126, 117, and 91 being inactive to gate pad signals. Latches 126, 117, and 91 are gating controls for gating error correction and CRC residues, while residual latch 118 gates data residual counts. This automatic pad gating simplifies logic of operation. In FIG. 11, gate-pad signal 120 extends from the middle of byte period 2 to the middle of byte period 6 transferring four bytes of padding signals. This signal is shown twice, respectively, for odd-even data byte counts as will be explained with respect to the check bit segment. Also, gate-pad signal may vary from zero to six in accordance with the number of residual bytes varying from six to zero.

Group B of the residual data segment is transferred by AND circuit 124 setting residual-count latch 118 and CRC–2 latch 126 via AND circuit 128. End latch 114 signifies to AND 124 that the record recording operation is terminating or ending, i.e., the residual or check bit segment is to be generated. Residual-count latch 118 immediately sets had-residual-count latch 135 as a memory during the subsequent ending operations indicating residual counts have been established. Latches 114 and 135 remain set until TAPE OP condition is received over line 138 from microprocessor 38 in accordance with U. S. Pat. No. 3,654,617.

Buffer 45, for the residual segment, receives the CRC–2 check byte or residue during byte period 6. CRC–2 latch 126 is set only when had-residual-count latch 135 is reset with AND 124 supplying its output signal to AND 128. AND 124 will supply a second output signal for the check bit segment which is blocked by AND 128. The CRC–2 check byte, generated as later described, is transferred to buffer 45 by the gate-CRC–2 signal (FIG. 11) from AND 127. AND 127 is activated as shown in FIG. 11 for transferring CRC–2 to register 33 of buffer 45. AND 127 is degated when ECC latch 91 is activated by AND 88. Latch 91 initiates transfer of the ECC check byte as previously mentioned and as detailed later. AND circuit 121 responds to the CRC–2 latch 126 being set to prevent transfer of the residual count (RCT). During the check bit segment transfer, CRC–2 latch 126 is reset permitting such transfer. In those systems not employing CRC–2, the residual count could be recorded in place of the CRC–2 check byte.

At the completion of the residual segment transfer, the binary counter 76 $\overline{4}$ signal resets residual-count latch 118, CRC–2 latch 126, and ECC latch 91 preparing those circuits for generating the check bit segment.

Returning now to residual-count latch 118, AND circuit 124 sets residual-count latch 118 to the active condition for both the residual and check bit segments in accordance with the joint action indicated by FIG. 10 tie lines. AND circuit 124 is activated when binary counter 76 is in the 4 state, GC 75 being in the GC–4 state as indicated by a signal on line 125, and end latch 114 being set. Residual-count latch 118 remains set until reset at the segment ends by the $\overline{4}$ signal of counters 76 on line 130.

Check bit or ECC segments are generated in one of two manners, depending upon whether the number of segments recorded through the residual segment is odd or even. In the event the number of segments is odd, that is, the CRC check byte will contain an even number of 1's, an extra byte of padding signals is inserted in byte position 1 of the check bit segment. The CRC bytes are then recorded in byte positions 2–6. The residual count field is loaded into byte position 7, and the ECC check byte or residue portion is loaded into byte position 8. When the number of segments is even, the CRC–1 residues are loaded into position 1–6.

Control of the contents of check bit segment byte position 1 is first described when the CRC–1 byte has an odd number of 1's based upon the signals recorded up through residual segment byte position 8. Odd/even-count-totals signal 139 is active during the residual segment indicating that the cound is odd. Upon generation of the check bit segment, the count is even requiring a CRC–1 byte having an odd number of 1's in accordance with the above-referenced Sellers, Jr., patent. To this end, AO (AND-OR) circuit 113, A2 portion, is jointly responsive to GC–0 signal on line 83 and the odd/even-indicator signal (active when odd) on line 134 to activate AND circuit A3. A3 is jointly responsive to the just-decoded signal, plus the had-residual-count latch 135 being active to set CRC–1 latch 117. In FIG. 11, signal tie-in shows this AND function action. CRC–1 latch 117 being set enables AND circuit 136 to generate the gate-CRC–1 signal on line 137 gating CRC–1 bytes from circuits 47 through gating logic 44 to group buffer 45 in positions 1–6 of the check bit segment. AND circuit 136 also receives additional inputs from the not-residual-count signal of latch 118 and the not-ECC-latch signal from latch 91.

In the event the CRC–1 byte would have an even number of 1's at the end of the residual segment, a padding byte of signals is incorporated in byte position 1. This makes the number of 1's in the CRC–1 byte odd as required by the ECC used for each segment. In the padding byte, the parity bit position will be a binary 1, i.e., track 8. In this case, odd-even signal 139A is inactive during the residual segment and becomes active upon the onset of the check bit segment. CRC latch 117 is then set in the second position, i.e., GC–2 portion of byte position 1, as indicated by the FIG. 11 AND function signal tie together 140. To accomplish this action, AND circuit portion A1 of AO 133 is jointly responsive to GC–2 signal on line 141 and the O–E (exclusive OR) circuit 142 output signal 134 to set the CRC–1 latch 117 to the active condition. OE 142 receives CROC–$2^0$ signal (a MOD 32 count) and BIN–$2^0$ signal to determine whether the number of data segments is odd or even. The gate-pad signal (FIG. 11) from AND circuit 115 gates all 0's to the buffer 45 position 1. AND 115 is deactivated by CRC–1 latch 117 becoming active at time GC–2. Subsequent to the padding byte being transferred during check bit segment byte position 1, the FIG. 9 illustrated circuitry repetitively supplies the CRC bytes in byte positions 2, 3, 4, 5, and 6. During the second half portion of byte position 6 (GC=4), the gate-CRC–1 signal for either the odd and even number of bytes, is deactivated by residual-count latch 118 being activated. The not-residual-count signal on line 150 becomes inactive deactivating AND 136. Residual-count latch 118 is set as previously described for the residual segment. Accordingly, during the second half of byte period 6 6, the residual count is gated as a portion of the check bit segment in byte period 7 by AND 121 signal on line 122. ECC LTH 91 is again set to the active condition during byte period 7, as previously described for recording the ECC byte during byte period 8. The ECC residue is recorded in two portions, eight bits in the ECC byte and eight bits in the parity track 8.

Upon transferring check bit segment byte 8, AND circuit 155 is jointly responsive to ECC LTH 91 being set, end latch 114 being set, CRC-1 latch 117 being set, and end data segment signal on line 104 to generate the end-data signal over line 156 as indicated in FIG. 11. End-data signal on line 156 sets write-3 latch 160 and simultaneously resets write-data latch 73. Write-3 latch 160 supplies activating signals to clock 74 and generator 71 to generate postamble signals as described in the Irwin U.S. Pat. No. 3,641,534. The postamble consists of the mark-2 signal group followed by other format signal groups (not shown). Upon completion of the postamble, an end-up signal is supplied over line 161 resetting write-3 latch 160 and supplying the end-up signal to microprocessor 38 for entering a termination routine as described in the Irwin U.S. Pat. No. 3,654,617.

READBACK CIRCUITS

Referring now more particularly to FIG. 12, the general logic arrangement of a readback system is described with references being made particularly to other figures which detail the operation of certain portions of the readback circuits.

From transducer assembly or head 51, low-level signals are amplified by linear amplifiers 170, one for each of the nine tracks. The amplified signals received by gating circuits 171 are sensed for appropriate amplitude and then gated as hard-limited signals to time-sense circuits 172 and detector 56. The operation of circuits 171 and 172 is shown by Andresen et al. in U. S. Pat. No. 3,670,304. Detector 56 corresponds to data detector 28 of that referenced patent application and is controlled in a similar manner. In addition, detector 56 selects between NRZI, PE, and run-length limited (RLL) coded detection in accordance with microprogram signals YA, YB, received from microprocessor 38 in accordance with FIG. 37 of Irwing U.S. Pat. No. 3,654,617. Detector 56 can be constructed in accordance with Vermeulen U.S. Pat. No. 3,548,327.

Detected 1's data is supplied over cable 58 to deskewing registers (SKB) 57. For each of the nine tracks, there is also a single line in cable 59 transferring pointer signals or quality signals to be deskewed in SKB 57 along with the data signals for aligning the storage coded values with their corresponding quality signals. Using the afore-described run-length limited coding, there will be five bit positions for each code group or value and a bit position for the quality signal associated with that code value as detected by detector 56. Such quality signals are those described by Hinz, Jr., U. S. Pat. No. 3,639,900 and also as described by Cannon in his article, "Enhanced Error Correction," IBM TECHNICAL DISCLOSURE BULLETIN, September 1971, Page 1,171. SKB 57 deskews the data and pointer bits as shown in Irwin U. S. Pat. No. 3,623,004 for self-clocking systems (PE and RLL) as well as for NRZI systems.

During the initial portion reading a record from a magnetic tape, the preamble is first read and detected, but not forwarded through SKB 57. To detect that a preamble is coming to an end, gated step RIC circuit 175 is responsive to a string of ten 1's in any of the tracks to initiate SKB 57 operation. Detected M1 marker groups are inserted in the respective deskewing buffers for use by format circuits 61.

SKB 57 cooperates with skew detector 178 to detect excessive skew as defined and taught by Morphet U. S. Pat. No. 3,154,762. The Morphet teaching applies to phase-encoded readback and to RLL readback. Upon detection of excessive skew, detector 178 supplies sense data over cable 179 to MPUY (not shown) in the Irwin U.S. Pat. No. 3,654,617. Additionally, excessive skew signals are supplied over cable 180 to deadtrack control 181 for initiating dead-tracking as generally taught by Miller U. S. Pat. No. 3,262,097. Deadtrack control 181 supplies deadtrack signals to circuits 175 to block transfer of data signals read from a deadtrack.

SKB 57 deskews the RLL and PE data in accordance with known deskewing techniques. When one byte of five-bit storage coded bits has been assembled in each of the nine tracks, a readout cycle is initiated in SKB 57. A first set of buffers, group buffer 1, GB-1 185, receives one group (five bytes) of deskewed storage coded signals and associated quality signals, or hardware pointers from SKB 57. Each time GB-1 185 is not full, it sends a request to SKB 57 for a transfer of one such byte. SKB 57 automatically responds to fill GB-1 185 in accordance with known data signal transferring techniques. It should be noted that the transfers between SKB 57 and GB-1 are independent of all other transfers in the readback system. It only requires that GB-1 be empty and SKB 57 has assembled and deskewed one group of storage coded signals.

The storage coded signals are then converted from the RLL storage code format to four-bit data processing coded groups, which include the check residue bits. GB-1, when full, supplies one group of signals from each of the nine tracks to decode 60. Decode 60 has one decoder for each of the nine tracks conveniently constructed in accordance with Irwin U.S. Pat. No. 3,624,637. Decode 60 has four groups of outputs. First are the detected format groups, such as M1, M2, and all-1's, which are supplied over cable 187 to format circuits 61. Second cable 188 transfers signals indicating that an illegal RLL code value has been decoded. This nine signal path cable connects to format detector 61 and eventually provides error signal pointers to error correction circuits 63. The other two cables 189 and 190 carry decoded data from either the RLL or PE recordings through single-byte buffer 191. The cable is selected in accordance with the control signals received over lines 192 from microprocessor 38. In the RLL mode, the decoded bytes are serially transferred through cable 189 as four byte signal groups (A or B). The detected and decoded format groups result in control signals from the control 61.

The decoded data transferred through buffer 191 is then processed by error correction circuits 63 as shown by Bossen and Hinz, Jr., supra, for example. For the present application, buffer 191 supplies the decoded data on a byte-by-byte basis for each group to syndrome generator 195 which generates S1 and S2 error-indicating syndromes. ECC matrices 196 jointly respond to the S1 and S2 syndromes, plus the data and pointers from pointer circuits 197, the generate error-pointing patterns for ECC control 200. The decoded data from buffer 191 also is transferred through segment buffer 201 and is stored there during the error detection and correction operations of syndrome generator 195, ECC matrices 196, and ECC control 200. Exclusive OR circuits 202, one circuit for each track, are jointly responsive to the error patterns from ECC control 200 and the data synchronously supplied from segment buffer 201 to supply correct data signals over cable 203 to ECC output byte buffer 204. Sequence controls (not shown) request seven consecutive write cycles for main buffer 43. At this time, GB-2 201 and ECC control serially and synchronously transfer seven bytes of error patterns and data signals through Exclusive OR's 202, register 204, to main buffer 43. These signals are also applied to CRC circuits 205 which contain the ECC-2 and ECC-3 circuits as detailed by Sellers, Jr., supra.

Returning now to pointer circuits 197, these circuits receive pointer signals from buffer 201 over cable 305 which resulted from detector 56 operation, from the RLL error detector in circuits 61 over cable 206 which indicate an illegal code value, from ECC control 200 indicating that a particular track has been corrected, plus GB-1 185. Based upon these inputs, pointer circuits 197 generate categories of pointers useful in error detection and correction as well as in deadtrack control. Generally speaking, pointer circuits 197 establish heirarchies of quality or pointer signals which, when positively indicating an error, are supplied as such to ECC matrix 196. If an error condition persists, a persistent pointer is generated and supplied to deadtrack control 181. In some instances, detector 56 generates pointer errors supplied over cable 59 and thence transferred to buffer 201. This may indicate a possible error condition with detector 56 correctly detecting the data. In such a case, pointer circuits 197 memorize that a pointer has been generated, such pointers are ignored by circuits 196, 200 until an error condition has been verified.

Readback operations include four types of cycles while processing signals. Each cycle consists of eight steps enumerated 0–7. Each step is divided into first and second portions, a first portion for transferring data signals and a second portion which sets up control circuits for operations in subsequent cycles. Outside of the cycles there are wait periods during which no synchronous signal processing operations occur with respect to buffers, error correction, and the like, even though recording and other readback circuits may be active at this time. Of the four cycles, two cycles (the A and B cycles) transfer, respectively, groups of signals between buffers GB-1 and GB-2, the A cycle transferring Group A of each segment and the B cycle transferring Group B of each segment. Format groups are always transferred during an A cycle. The third cycle, the AB cycle, controls the operation of the error correction circuits. If there are no errors in the data, cycle AB is omitted. If there is an uncorrectable error, the readback operation is stopped. The fourth cycle, ABC, transfers one segment of seven bytes of data signals from error correction circuits 63 over cable 203 to main buffer 43 via register 204.

The designer can select any codes or combinations of codes for practicing the present invention. The described track rotations can be employed as successive time slots or frames in a serial transmission system. Any number of code positions may be used with any number of record tracks or time slots.

While the invention has been particularly shown and described with reference to a preferred embodiment thereof, it will be understood by those skilled in the art that various changes in form and detail may be made therein without departing from the spirit and scope of the invention.

What is claimed is:

1. A plural-channel digital transfer system for exchanging signals with plural tracks on a record member;

means scanning said tracks for exchanging signals therewith with such signal exchanges with the respective tracks having different probabilities of errors;

means repeatedly arranging parallel groups of signals with respect to said tracks;

the improvement including in combination:

first polynomial-type error detection and correction means (ECC-1 means) for receiving said groups of signals and generating check signals capable of indicating a first set of errors and correcting a second set of errors less than said first set, said signals in the respective tracks having a predetermined mathematical relationship to said ECC-1 means polynomial wherein given tracks exhibiting a given probability of error greater than other tracks are related only to nonadjacent terms of said ECC-1 means polynomial;

means associating each said signal groups with each said ECC-1 means check signals in said tracks; and second error detection means (ECC-2 means) being of a polynomial type for receiving said groups of signals and generating check signals for indicating a third set of errors less than said first and second sets by including errors not in said first and second sets and having a polynomial-to-track relationship different from such relationship to said ECC-1 means.

2. The system set forth in claim 1 further including a third error detection means (ECC-3 means) receiving said groups of signals and capable of detecting errors therein and having yet another track-to-polynomial relationship and thereby checking some signal errors not checked by said ECC-2 means.

3. Error detection and correction apparatus for operating with a set of data signals consisting of sequential sub-groups of data, each sub-group having error detection and correction first check bit residues having a capability of indicating a given number of bits in error;

ECC-1 means for operating with said first check bit residues and having said capability of detecting said given number of bits in error;

second error detection means (ECC-2 means) operating on all of said sub-groups and having a capability of error correction less than said first-mentioned error detection and correction and operating with a second check bit residue smaller than said first check bit residue;

said ECC-1 means receiving said signals including said residues for comparing said first residue with the received data signals for correcting errors therein;

said ECC-2 means receiving said corrected signals and said second residue for verifying proper correction in accordance with said first residue; and each ECC means being constructed in accordance with an error code including a polynomial having a plurality of terms relating to input positions of the respective ECC means;

permutation means interposed between said data signals and one of said ECC means for altering the mathematical relationships between the data and the respective error detection and correction polynomials by altering signal inputs to said positions, said permutation means being adjusted in accordance with error patterns expected in the transmission of said data signals.

4. The apparatus set forth in claim 3 including nonlinear means in one of said permutation means for introducing a nonlinear relationship between one of said error code polynomials and said data sets while maintaining a linear relationship between said data sets and another one of said ECC means.

5. The apparatus set forth in claim 4 wherein said nonlinear means is introduced in said permutation means between said data set and said ECC-2 means, and said ECC-2 means further including a residue based upon not only the data signals, but also said first residue.

6. The apparatus set forth in claim 5 wherein said nonlinear means includes changing the coded form of the data, and said permutation means further including switching means for altering the relationship of the nonlinearly changed data to said ECC-2 means.

7. The method of enhancing error detection for a given check bit redundancy including the steps of employing a first error detection and correction code for operating on a given data set in a given manner;

introducing a nonlinear change into the data set; and then employing a second error detection code for detecting errors in the nonlinearly changed data set.

8. The method set forth in claim 7 further including the step of introducing a linear change in said data set with respect to said second error detection code as compared with the relationship of the data set to said first error detection code, said linear change including altering the relationship of data portions to polynomial terms mathematically representing the error detection apparatus.

9. The method set forth in claim 8 further including segmenting said data sets and employing said first error correction respectively on each of said segments, such application being independently applied to each of said segments;

employing a third error detection code similar to said second error detection code on said entire set of data for detecting errors and miscorrections made by employing said first error correction code; and employing said second error detection code to check not only the data sets, but all of the residual redundancies of said first and third error correction code operations.

10. Apparatus for encoding data having a plurality of check bit redundancies, including in combination;

first error correction code means operating on received data sets and supplying an error correction indicating residue;

nonlinear encoding means receiving said data sets and said residue for effecting a nonlinear code change in both said data set and said residue; and second error detection means receiving said nonlinearly encoded data and residue, and generating second check bit residue based upon said received nonlinearly coded data and residue and supplying said nonlinearly encoded signals and said second error detection code residue as output coded values.

11. A decoding system for receiving input nonlinearly coded values including data and first check bit residues, the improvement including in combination:

a nonlinear decoder converting said received input coded values into nonlinearly changed decoded values;

first ECC means receiving said nonlinearly decoded values and applying a first error correction operation thereon including correcting data signals based upon said first residues received with said data signals from said nonlinear decoder for supplying corrected output data signals; and second ECC means receiving said input coded values and generating an error detecting residue in accordance therewith; including compare means receiving said second ECC generated residue and a residue received from said input coded values for indicating any errors in said input coded values.

12. The decoder set forth in claim 11 further including third ECC means operatively associated with said first ECC means and said nonlinear decoder means for detecting miscorrected errors by said first means and further including permutation means for altering a polynomial-to-data-set relationship, as between said first and third ECC means and said data.

13. The decoder set forth in claim 11 further including a nonlinear encoder receiving the corrected data signals from said first ECC means and re-encoding same into a nonlinear form similar to said input coded values; and said second ECC means receiving the nonlinearly encoded values from said nonlinear encoder rather than from said input coded value inputs.

14. The decoder set forth in claim 13 further including third ECC means operatively associated with said first ECC means and said nonlinear decoder for detecting miscorrected errors, and said residues associated with said first and third ECC means being supplied to said nonlinear encoder in the same manner as said corrected data signals.

15. A magnetic recording and reproducing system of the multitrack type having first and second portions respectively adapted for recording received signals and supplying readback signals, sets of such digital signals being exchanged with at least some of the tracks in parallel via a multitrack head, the improvement including in combination:

first error detection and correction means (ECC-1 means) operatively associated with said first and second portions of said recorder and including predetermined permutation means interposed between said head and said error correction means, said head including two outer track scanning transducers, a first of said error correction means receiving signals from said outer transducers in relatively widely spaced nonadjacent input portions associated respectively with nonadjacent polynomial terms representing an error correction code on which the apparatus operation is based and further including that no adjacent tracks of said multitrack system exchange signals to any adjacent error correction inputs respectively representing adjacent terms of such code;

second error detection means (ECC–2 means) also receiving data signals to be recorded or read back and having a relationship with respect to said tracks which is different from said relationship between said tracks and said polynomial of said first ECC means;

one of said tracks being denoted as a check bit recording track, and said check bit recording track supplying and receiving signals from the lowest ordered polynomial position of both said first and second ECC means; and third ECC means receiving signals from and supplying signals to said tracks in a third permutation of polynomial-to-track relationships wherein no adjacent tracks are supplied to adjacent inputs representing adjacent terms of polynomial on which said third ECC means is constructed, and said outer ones of said transducers also being supplied to nonadjacent inputs representing nonadjacent terms of said polynomial.

16. The system set forth in claim 15 wherein signals exchanged with a first one of said outer transducers being supplied to three different input portions of each said ECC means respectively representing different ordered terms of three polynomials respectively defining said ECC means operations and signals exchange with a second one of said outer transducers being supplied to a different set of different input portions representing, respectively, three different polynomial terms and in differing orders in the respective ECC means.

17. The system set forth in claim 16 wherein each and every track of said multitrack system is applied to different input portions respectively representing different terms of polynomials in said ECC–1 and ECC–3 means.

18. The system set forth in claim 17 wherein said ECC–2 means has a predetermined polynomial input-portion-to-track relationship and said ECC–1 and ECC–2 means having their respective track-to-polynomial relationship different such that no track supplies input signals to the same input portion in said ECC–1 or ECC–3 means.

19. The system set forth in claim 18 wherein said ECC–1 means receives and supplies signals to the fifth track from its third position, to and from the seventh track from its sixth position, to and from the third track from its ninth position, to and from the eighth track from its first position, to and from the second track from its fifth position, to and from the first track from its eighth position, to and from track zero from its second position, to and from the sixth track from its fourth position, and to and from the fourth track from its seventh position, wherein tracks 4 and 5 are the outside tracks; and said ECC–3 means exchanging signals with the fifth track from its fourth position, the seventh track from its fifth position, the third track from the eighth position, the eighth track from its sixth position, the second track from the ninth position, the first track with the seventh position, track zero with the third position, the sixth track with the first position, and the fourth track from the second position.

20. The system set forth in claim 18 further including nonlinear means interposed between said data signals and one of said ECC means.

21. The system set forth in claim 20 wherein said nonlinear means is interposed between said ECC–1 means and said ECC–2 means and said ECC–2 means receives at least nonlinearly changed data signals.

22. The system set forth in claim 21 wherein said ECC–2 means receives the nonlinearly changed data signal plus the nonlinearly changed residues generated by said ECC–1 means.

23. The system set forth in claim 18 further including means on one of said ECC means operative with said recording system for selectively changing one of said permutation means.

24. The method of operating a magnetic recording and readback system having means for receiving and supplying signals with respect to a magnetic media, the improved method including the following steps in combination:

providing a plurality of error detection and correction means for operating on signals exchanged with the media; and selectively providing permutations between said error detection and correction means and said data signals in accordance with a probability of error exhibited by the signals exchanged with said media and including providing a different permutation-to-signal relationship to each and every one of said error correction means.

25. The method set forth in claim 24 wherein said magnetic recording system is of the multitrack type, the method further including the following steps:

treating outside ones of said tracks in a multitrack system as adjacent tracks insofar as exhibiting the same probability of error therebetween and exchanging signals between said outside tracks, any of said adjacent tracks, and at least one of said error correction means in a manner such that no signals exchanged with two adjacent tracks or said outside tracks are applied to input positions of said one error detection means that are mathematically nonadjacent with respect to a polynomial, the basis of which said error correction means is constructed, respectively.

26. The method of operating a signal transfer system, including the following steps in combination:

providing large sets of data signals and subdividing said sets of data signals into subsets and establishing a relative probability of error in transmission in each of said subsets, one with respect to the other; and applying multiterm polynomial-based error detection and correction operations on said signal sets in such a manner that error correcting polynomials applied to data subsets exhibiting similar probabilities of errors are applied to said polynomial such that such subsets exhibiting similar probabilities of error are received and operated upon by nonadjacent terms of said polynomial.

* * * * *

PO-1050
(5/69)

UNITED STATES PATENT OFFICE
CERTIFICATE OF CORRECTION

Patent No. 3,786,439 Dated January 15, 1974

Inventor(s) Earl G. McDonald, Arvind M. Patel

It is certified that error appears in the above-identified patent and that said Letters Patent are hereby corrected as shown below:

Column 4, Line 11, "eaqch" should be --each--.

Column 12, Line 67, "AND" should be --and--.

Column 13, Lines 2 & 3, delete "t-wo-thirds" and insert --2/3--.

Column 14, Line 62, "to" (first occurrence) should be --of--.

Column 15, Line 49, "33" should be --3--.

Column 16, Line 50, "position" should be --portion--.

Column 17, Line 6, delete "6" (first occurrence).

Column 20, Line 16, after "digital" insert --signal--.

Column 20, Line 44, "by" should be --but--.

Signed and sealed this 9th day of July 1974.

(SEAL)
Attest:

McCOY M. GIBSON, JR.
Attesting Officer

C. MARSHALL DANN
Commissioner of Patents